(12) United States Patent
Murao

(10) Patent No.: US 6,728,406 B1
(45) Date of Patent: Apr. 27, 2004

(54) IMAGE ANALYZING APPARATUS AND METHOD AS WELL AS PROGRAM RECORD MEDIUM

(75) Inventor: Kohei Murao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 09/634,911

(22) Filed: Aug. 9, 2000

(30) Foreign Application Priority Data

Sep. 24, 1999 (JP) .......................................... 11-270175

(51) Int. Cl.$^7$ ................................................ G06K 9/46
(52) U.S. Cl. ...................... 382/191; 382/165; 382/243; 375/240.08; 375/240.19
(58) Field of Search ........................ 382/115–116, 162, 382/164–165, 173, 181, 190–191, 197, 203, 209, 217–218, 228, 240, 243, 248, 272, 276; 358/403; 707/1–10; 375/240.08, 240.11, 240.19

(56) References Cited

U.S. PATENT DOCUMENTS 6,477,269 B1 * 11/2002 Brechner ..................... 382/165
6,532,307 B1 *  3/2003 Sato ............................. 382/240

FOREIGN PATENT DOCUMENTS

JP         10-70722        3/1998

OTHER PUBLICATIONS

Jacobs, et al. "Fast multi–resolution image querying", ACM, pp. 1–9, 1995.*
Ma, et al. "Benchmarking of image features for content based retrieval", IEEE, pp. 253–257, 1998.*
Yue, et al. "Texture image retieval by universal classification for wavelet transform coefficients", IEEE, pp. 220–223, 1997.*
Stollnitz, et al. "Wavelet for computer graphics: a primer, part 2", IEEE, pp. 75–85, 1995.*
Remias, et al. "Block–oriented image decomposition and retrieval in image database systems", IEEE, pp. 85–92, 1996.*
Li, et al. "Wavelet transform for directional feature extraction in medical imaging", IEEE, pp. 5001028, 1997.*
Wang, et al. "Wavelet–based image indexing techniques with partial sketch retrieval capability", IEEE, pp. 13–24.*
Ortega, et al. "Supporting ranked boolean similarity queries in mars", pp. 905–925.*

* cited by examiner

*Primary Examiner*—Daniel Mariam
(74) *Attorney, Agent, or Firm*—Staas & Halsey LLP

(57) ABSTRACT

A gray scale image or a color image is entered for wavelet transformation. A layout feature is determined from a coefficient of the lowest frequency band after the wavelet transformation. A shape feature is determined from a coefficient of the second lowest frequency band after wavelet transformation. Furthermore, a texture feature is determined from the average and deviation of frequency bands excepting the lowest frequency band after wavelet transformation.

10 Claims, 19 Drawing Sheets

| Low | 3/128, 3/64, 1/8, 19/64, 45/64, 19/64, 1/8, 3/64, 3/128 |
|---|---|
| High | −1/4, 1/2, −1/4 |

KEY IMAGE
(SIMILARITY 100%)

FIRST CANDIDATE
(WITH DIFFERENT ANGLE)
(SIMILARITY 90%)

SECOND CANDIDATE
(WITH DIFFERENT BUILDING)
(SIMILARITY 80%)

THIRD CANDIDATE
(WITH DIFFERENT BUILDING)
(SIMILARITY 60%)

KEY IMAGE
(SIMILARITY 100%)

FIRST CANDIDATE
(WHITE-BLACK REVERSAL)
(SIMILARITY 100%)

SECOND CANDIDATE
(WITH WINDOW)
(SIMILARITY 90%)

KEY IMAGE
(SIMILARITY 100%)

FIRST CANDIDATE
(SIMILARITY 90%)

SECOND CANDIDATE
(SIMILARITY 80%)

n-TH CANDIDATE
(SIMILARITY 5%)

IMAGE ANALYZING APPARATUS AND METHOD AS WELL AS PROGRAM RECORD MEDIUM

BACKGROUND OF THE INVENTION

1. Field of the Invention

The present invention relates generally to an image analyzing apparatus and method for automatically retrieving image features, as well as a computer readable program record medium in which an image feature extraction program is stored, and, more particularly, to an image analyzing apparatus and method for extracting image layout, shape and texture features through the utilization of coefficients of frequency bands for wavelet transformation, as well as a computer readable program record medium having therein stored an image feature extraction program.

2. Description of the Related Arts

Nowadays, due to the broad use of digital images attendant on the spread of Internet, a lot of attention is paid to the similar image retrieval based on the image contents in a personal digital library, an Internet provider's retrieval service, a public digital library, etc. For this similar image retrieval, it is conceived to extract features from an image. A lot of researches have addressed the image features, with the attention to the color, texture, shape, etc. For the color feature by way of example, a histogram in accordance with Reference 1 which follows has been used as the simplest feature.

[Reference 1] M. Ortega et al. IEEE Trans. Knowledge and Data Engineering, vol. 10, no. 6, pp. 905–025, 1998.

However, the feature based on the color histogram may lack intra-image spatial information. This often leads to a use of the image segmented layout feature therewith. There exist innumerable researches on the texture, some of which are based on the autoregressive model or frequency analysis. A recent report says that use of the wavelet transformation may result in excellent performance. An edge detection is basically and widely used for the shape feature. The edge detection is too sensitive to a displacement, which needs some modification.

However, in such a conventional feature extraction for image retrieval, etc., use has been made of algorithms dedicated to items such as layout, shape and texture, to extract the features. For this reason, it is necessary to perform the feature extraction from the key image for each of the items such as the layout, shape, texture, etc., thus making the image retrieval time-consuming.

On the other hand, a rapid image retrieval using the wavelet transformation is described in References 2 and 3 which follow.

[Reference 2] C. E. Jacobs et al. Computer Graphics Proceedings, Annual Conference Series, pp. 277–286, 1995.

[Reference 3] E. J. Stollnitz et al. "Wavelets for Computer Graphics", Morgan Kaufmann Publishers, Inc. 1996.

However, these image retrievals using the wavelet transformation may suffer from a deficiency that the entire image is wavelet transformed to use the entirety of each frequency band as the feature, so that a retrieval is possible of only images totally analogous to the key image, thus making difficult a flexible retrieval, i.e., a retrieval of analogous images through the grasp of the individual features such as the layout, shape or texture possessed by the key image.

SUMMARY OF THE INVENTION

The present invention provides an image analyzing apparatus and method capable of a rapid image feature extraction and of a highly flexible feature extraction ensuring individual extractions of features such as layout, shape and texture, and provides a program record medium having an image feature extraction program stored therein.

The present invention further provides an image analyzing apparatus and method having a scale invariance capable of recognizing images having the same contents as the same one irrespective of the size and capable of retrieving in spite of interminglement of color images and gray scale images, and further provides a computer readable program record medium having an image feature extraction program stored therein.

According to a first aspect of the present invention, there is provided a image analyzing apparatus comprising a wavelet transformation unit for receiving images to effect a wavelet transformation thereon; and a feature extraction unit for extracting features of images separately in the form of layout, shape and texture features, on the basis of coefficients of frequency bands after wavelet transformation. For this reason, as compared with the prior art example in which the layout, shape and texture features have been extracted by independent algorithms, the present invention can achieve a high-speed extraction of features belonging to different categories by making use of the wavelet transformation to thereby unify the algorithms for extracting the layout, shape and texture features.

The wavelet transformation unit of the present invention performs a wavelet transformation for multiple resolution analysis after the determination of the decomposition number by the decomposition number determination unit so as to allow the size of the lowest frequency band of the wavelet transformed data to become smaller than a predetermined size. In this manner, the present invention utilizes the multiple resolution properties of the wavelet transformation, with the result that the features can be extracted without depending on the image size, and a scale invariance is presented that allows the images having identical contents to be recognized as similar ones irrespective of the size.

It is essential for the feature extraction unit to be able to extract features in the form of the gray scale images. To this end, it comprises a layout feature extraction unit for determining a layout feature from a coefficient of the lowest frequency band LL in the wavelet transformed data structure; a shape feature extraction unit for determining a shape feature from coefficients of the second lowest frequency bands HL0, LH0 and HH0 after wavelet transformation; and a texture feature extraction unit for determining a texture feature from the average and deviation of frequency bands HLn, LHn and HHn (where n=0, 1, typically n=0, 1, 2, . . . ) excepting the lowest frequency band LL after wavelet transformation.

In cases where the present invention deals color images, the wavelet transformation unit, upon reception of a color image in RGB color space by an RGB/YUV transformation unit, transforms the RGB color image received into a color image in YUV space to thereafter effect a wavelet transformation thereon. In case of the color images, the layout depends on the distribution of colors. The layout feature extraction unit thus has only to consider a deal of the color at the roughest resolution region in the wavelet transformation. The coefficient of the lowest frequency band LL after wavelet is transformed into a color representation in the other color space matching the human senses, to thereby determine the layout features. The shape and texture features involve no color concepts. Thus, in case of using YUV as the color space, the features of the luminance components Y on which the most amount of signals may concentrate are retrieved. That is, the shape feature extraction unit uses only luminance values Y of YUV components constituting the coefficients of the second lowest frequency bands HL0, LH0 and HH after wavelet transformation to thereby determine the shape feature. Furthermore, the texture feature extraction unit determines the texture feature from the average and deviation of only luminance values Y of YUV components constituting coefficients of frequency bands HLn, LHn and HHn (n=0, 1, 2, . . . ) after wavelet transformation. The layout feature extraction unit transforms the coefficient of the lowest frequency band after wavelet transformation into a color representation in HSV color space, Lab color space or Munsell color space to thereby determine the layout feature. The layout feature extraction unit normalizes the lowest frequency band after wavelet transformation into a predetermined size. This ensures a scale invariance with which the images having the same contents can be recognized as the same one in spite of the different sizes. More concretely, the layout feature extraction unit interpolates shorter sides of the lowest frequency band LL after wavelet transformation to thereby achieve a size normalization. With respect to three bands HL0, LH0 and HH0 in each of which is arranged the coefficient of the second lowest frequency band after wavelet transformation, the shape feature extraction unit finds an absolute value of each coefficient and averages coefficients at relatively same locations within the bands into one band coefficient. This allows the layout feature and the shape feature to result in the same amount of data. The texture feature extraction unit generates as texture features a vector whose vector components are an average and a deviation of coefficients of frequency bands of contour vertical components HL0 and HL1 excepting the lowest frequency band LL after wavelet transformation, a vector whose vector components are an average and a deviation of coefficients of frequency bands of contour horizontal components LH0 and LH1, and a vector whose vector components are an average and a deviation of coefficients of frequency bands of contour diagonal components HH0 and HH1.

The image analyzing apparatus of the present invention quantizes the values of the layout feature, shape feature and texture feature that have been determined from the coefficient of the frequency bands after wavelet transformation, into one byte length, to thereby reduce the amount of data for speedup. The image analyzing apparatus further comprises a similarity calculation unit figures out similarities between two images with respect to the layout feature, the shape feature and the texture feature that have been extracted by the feature extraction unit, the similarity calculation unit imparting weights to the similarities to figure out a total similarity between two images. By varying the weights to be imparted to the similarities of the layout, shape and texture, a highly flexible retrieval depending on the object can be achieved. For example, by rendering only the similarity of the shape feature effective, it is possible to retrieve images of, e.g., analogous but white-black reversal posters or of vehicles of the same type but different in color.

Alternatively, by rendering only the weight for the texture feature similarity effective, it is possible to retrieve images analogous in roughness of fabric texture or images of minerals or fossils having similar surfaces.

According to a second aspect of the present invention there is provided an image analyzing method comprising the steps of entering an image for a wavelet transformation; determining a layout feature from a coefficient of the lowest frequency band after wavelet transformation; determining a shape feature from a coefficient of the second lowest frequency band after wavelet transformation; and determining a texture feature from an average and a deviation of frequency bands excepting the lowest frequency band after wavelet transformation. The details of the image analyzing method are the same as those of the image analyzing apparatus.

According to a third aspect of the present invention there is provided a computer readable record medium having an image feature extraction program stored therein, the program comprising the steps of entering an image for a wavelet transformation; determining a layout feature from a coefficient of the lowest frequency band after wavelet transformation; determining a shape feature from a coefficient of the second lowest frequency band after wavelet transformation; and determining a texture feature from an average and a deviation of frequency bands excepting the lowest frequency band after wavelet transformation. The details of the computer readable program record medium having therein stored the image feature extraction program are also the same as those of the image analyzing apparatus.

The above and other objects, aspects, features and advantages of the present invention will become more apparent from the following detailed description when taken in conjunction with the accompanying drawings.

DETAILED DESCRIPTION OF THE PREFERRED EMBODIMENTS

Figure 1:
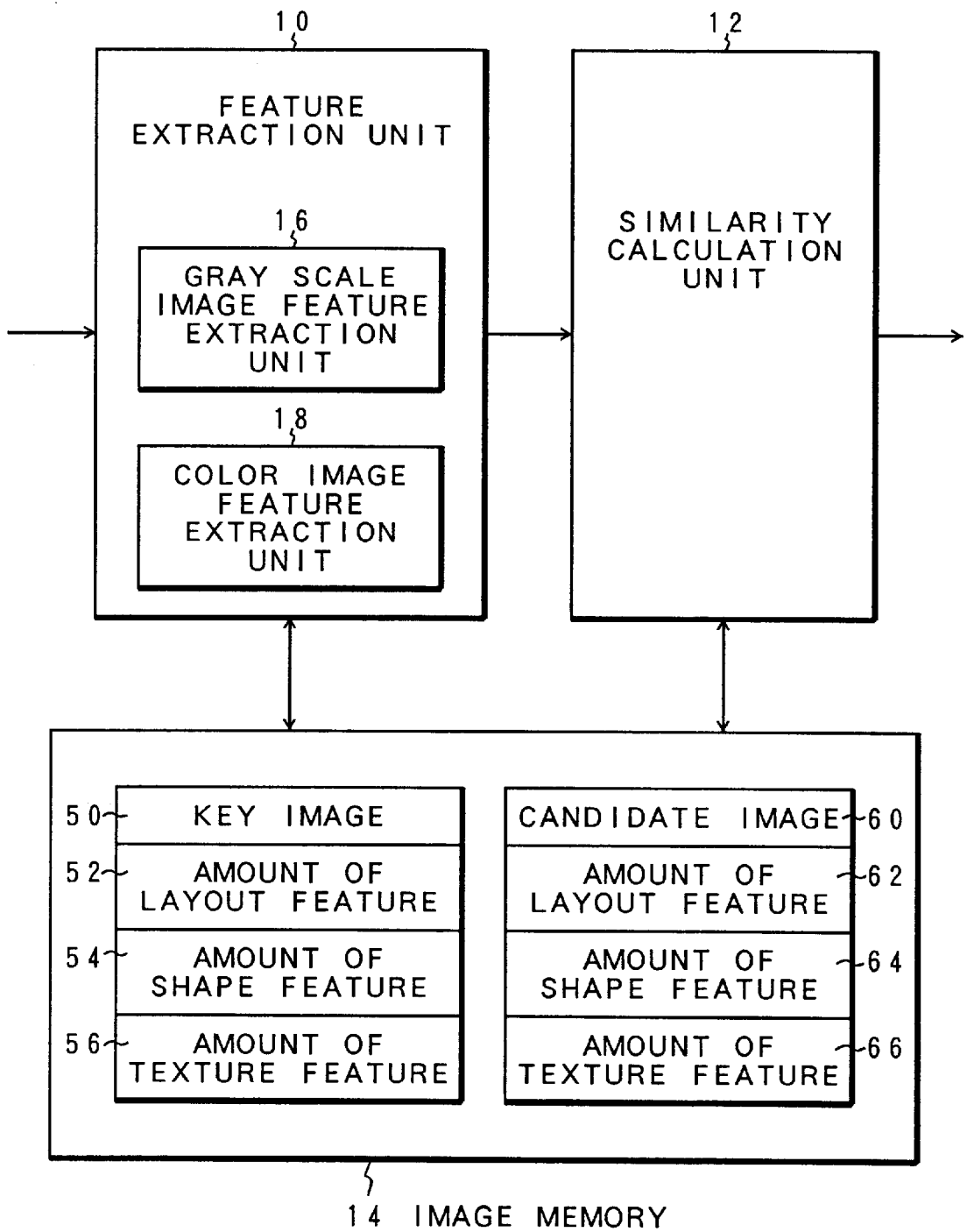
FIG. 1 is a block diagram of a similar image retrieval system incorporating an image analysis apparatus of the present invention.

FIG. 1 is a block diagram of a similar image retrieval system incorporating an image analysis apparatus in accordance with the present invention. The similar image retrieval system is constructed from a feature extraction unit 10, a similarity calculation unit 12 and an image memory 14. The feature extraction unit 10 serves as the image analysis apparatus of the present invention and comprises a gray scale image feature extraction unit 16 and a color image feature extraction unit 18. The image memory 14 stores therein the feature of a key image 50 entered for the similar image retrieval and the feature of a candidate image 60. More specifically, the image memory 14 stores therein layout features 52 and 62, shape features 54 and 64 and texture features 56 and 66, of the key image 50 and the candidate image 60, respectively. Among them, the layout feature 62, the shape feature 64 and the texture feature 66 of the candidate image 60 are feature data read from a previously prepared data base. The present invention is applied intactly to the feature extractions upon creation of the data base. The similarity calculation unit 12 figures out the similarities of the layout features, the shape features and the texture features extracted by the feature extraction unit 10, of the key image 50 and the candidate image 60, respectively, to make a total judgment.

Figure 2:
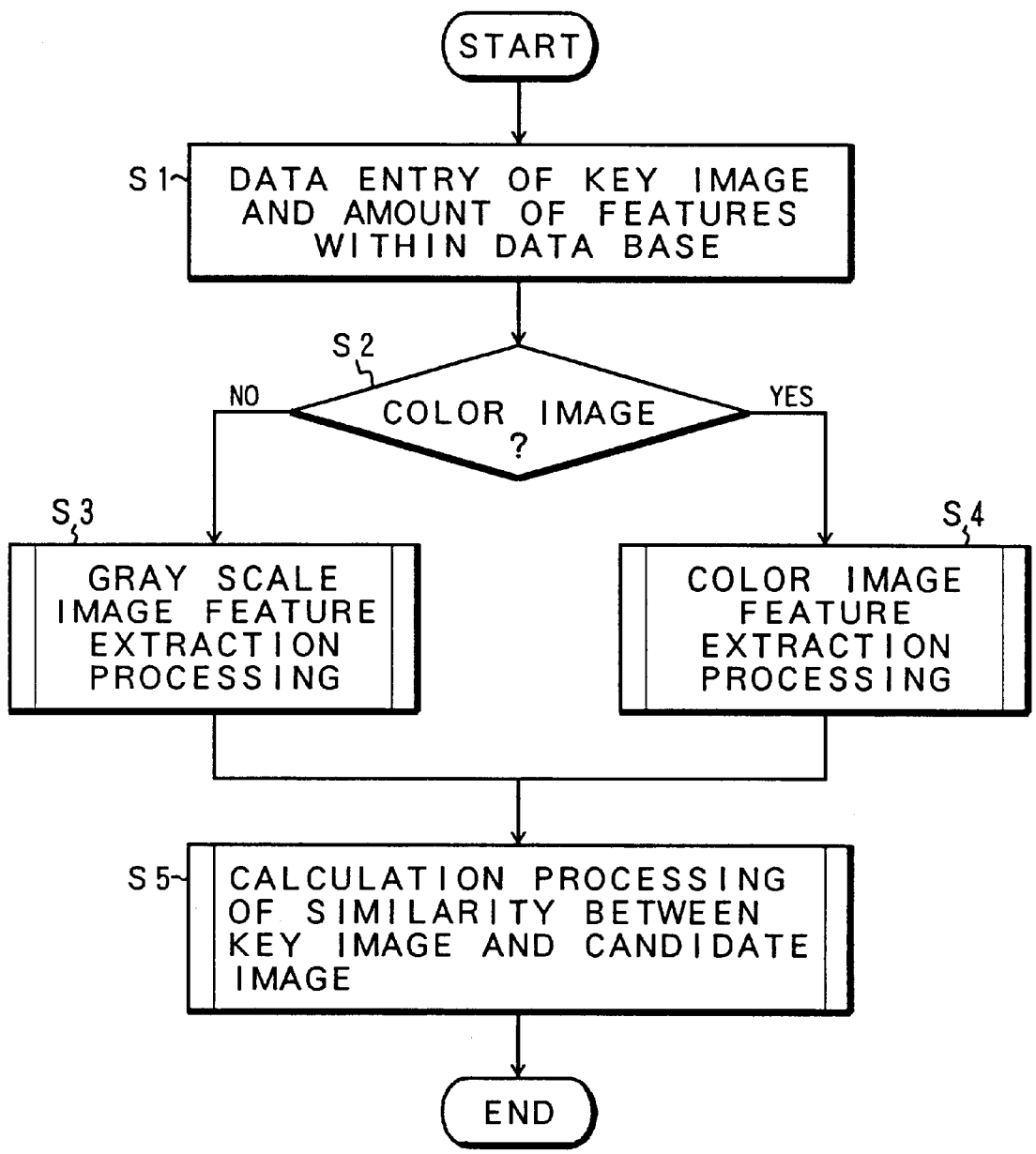
FIG. 2 is a flowchart of similar image retrieval processing effected by the retrieval system of FIG. 1.

FIG. 2 is a flowchart of processing actions of the similar image retrieval system of FIG. 1. Prepared in the actual similar image retrievals is a feature data base in which features of images to be retrieved are stored through extractions in accordance with the present invention. The feature data base is built on a server for example so that upon a receipt of a similar image retrieval demand through provision of a key image from a client, a key image feature is extracted on the server. Comparison is then made between the thus extracted key image feature and an image feature which has previously been extracted from the data base, to judge the similarity, allowing a client to display the result. A key image and feature data within the data base are first entered in step S1. In this case, the key image to be entered can be either a gray scale image or a color image. A check is then made in step S2 to see if the entered image is a color image or not. If it is a gray scale image, then the procedure advances to step S3 in which gray scale image feature extraction processing is carried out by the gray scale image feature extraction unit 16. If it is a color image, then the procedure goes to step S4 in which color image feature extraction processing is carried out by the image feature extraction unit 18. Then the procedure advances to step S6 in which the similarity calculation unit 12 performs calculation processing of the similarity between the key image feature and the candidate image feature entered from the data base. The similarity calculation processing of the present invention includes processing for the layout features, shape features and texture features of the key image and the candidate image, respectively. If needed, an y features may be weighted for the similarity calculation and then the calculation results may be put together to make a total judgment of the image similarities.

Figure 3:
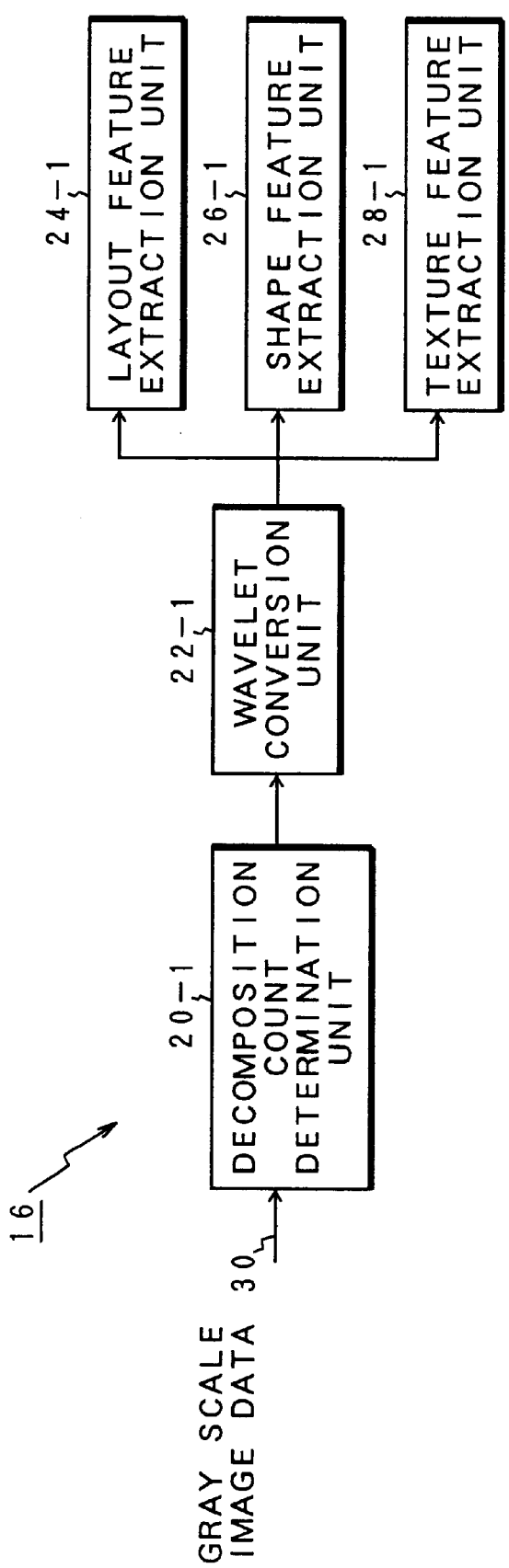
FIG. 3 is a function block diagram of a gray scale image feature extraction unit shown in FIG. 1, which is an embodiment of the present invention.

FIG. 3 is a function block diagram of the gray scale image feature extraction unit 16 provided in the feature extraction unit 10 of FIG. 2. The gray scale image feature extraction unit 16 comprises a decomposition number determination unit 20-1, a wavelet transformation unit 22-1, a layout feature extraction unit 24-1, a shape feature extraction unit 26-1 and a texture feature extraction unit 28-1. In terms of program structures, the functions of the gray scale image feature extraction unit 16 include a function for determining the resolution decomposition number from image size information corresponding to the decomposition number determination unit 20-1, a function for effecting a resolution decomposition through a wavelet transformation corresponding to the wavelet transformation unit 22-1, and a function for retrieving features of layout, shape and texture from data subjected to wavelet transformations corresponding to the layout feature extraction unit 24-1, the shape feature extraction unit 26-1 and the texture feature extraction unit 28-2.

Figure 4:
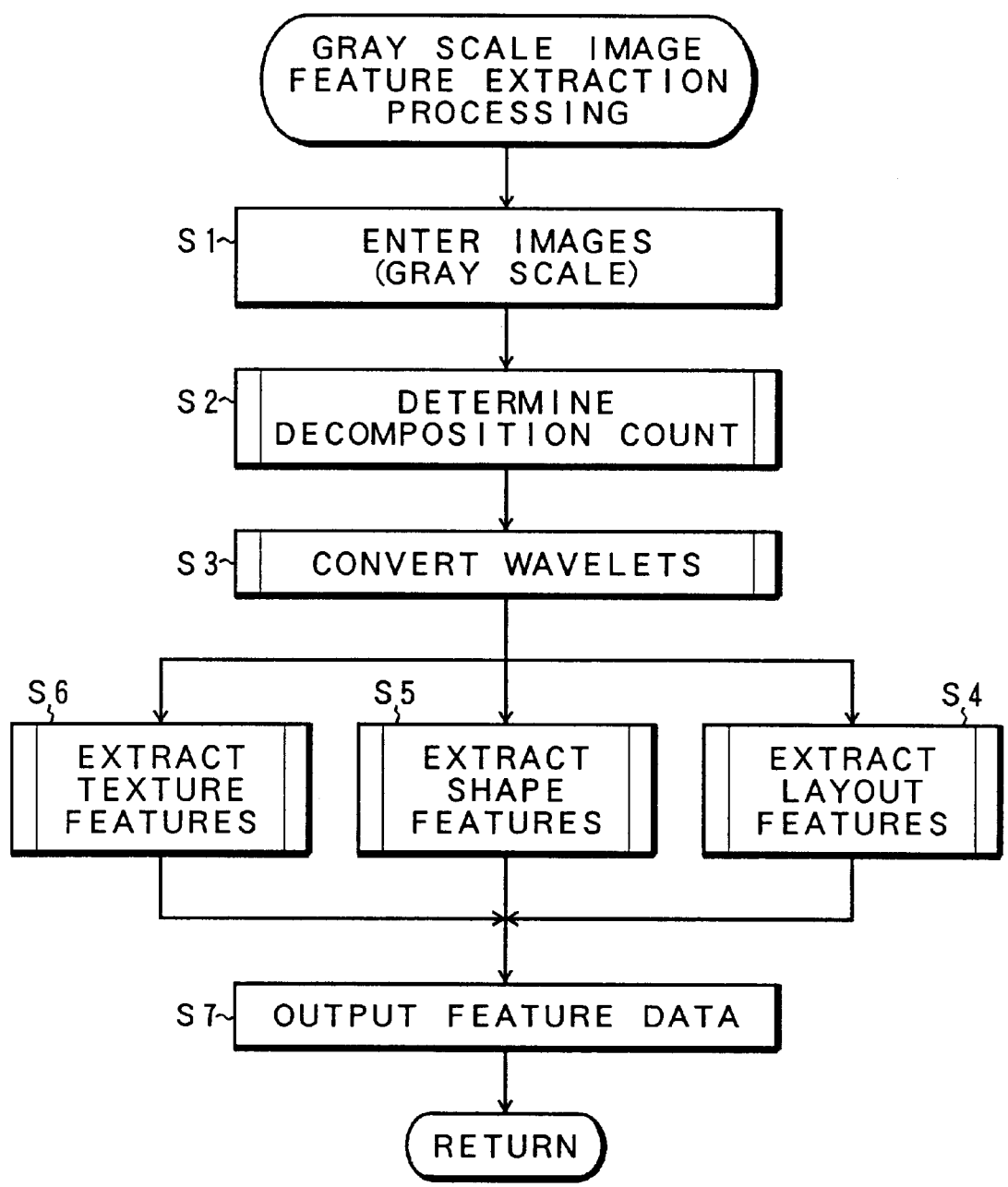
FIG. 4 is a flowchart of gray scale image feature extraction processing effected by the gray scale image feature extraction unit of FIG. 3.

FIG. 4 is a flowchart of gray scale image feature extraction processing corresponding to FIG. 3. In this processing, gray scale images are entered in step S1, and the decomposition number K for wavelet transformation is determined in step S2. This decomposition number K is dynamically determined depending on the image size so that the decomposition continues until the size of the lowest frequency band LL in the data structure after wavelet transformation reduces to a predetermined size or smaller. This decomposition number determination processing will become more apparent from the description which will be made later. Then in step S3 a multiple resolution analysis (MRA) in accordance with the decomposition number K is carried out by means of the wavelet transformation. Then in steps S4, S5 and S6 the wavelet transformed data are subjected to the feature extraction processings including the texture feature extraction, the shape feature extraction and the layout feature extraction, respectively. The resultant feature data are then provided as outputs in step S7. In the layout feature extraction of step S4, the layout feature is figured out on the basis of the coefficient of the post-wavelet transformation lowest frequency band. In the shape feature extraction of step S5, the shape feature is figured out on the basis of the coefficient of the post-wavelet transformation second lowest frequency band. Furthermore, in the texture feature extraction of step S6, the texture feature is figured out on the basis of the average and the deviation of frequency bands excepting the post-wavelet transformation lowest frequency band.

Figure 5:
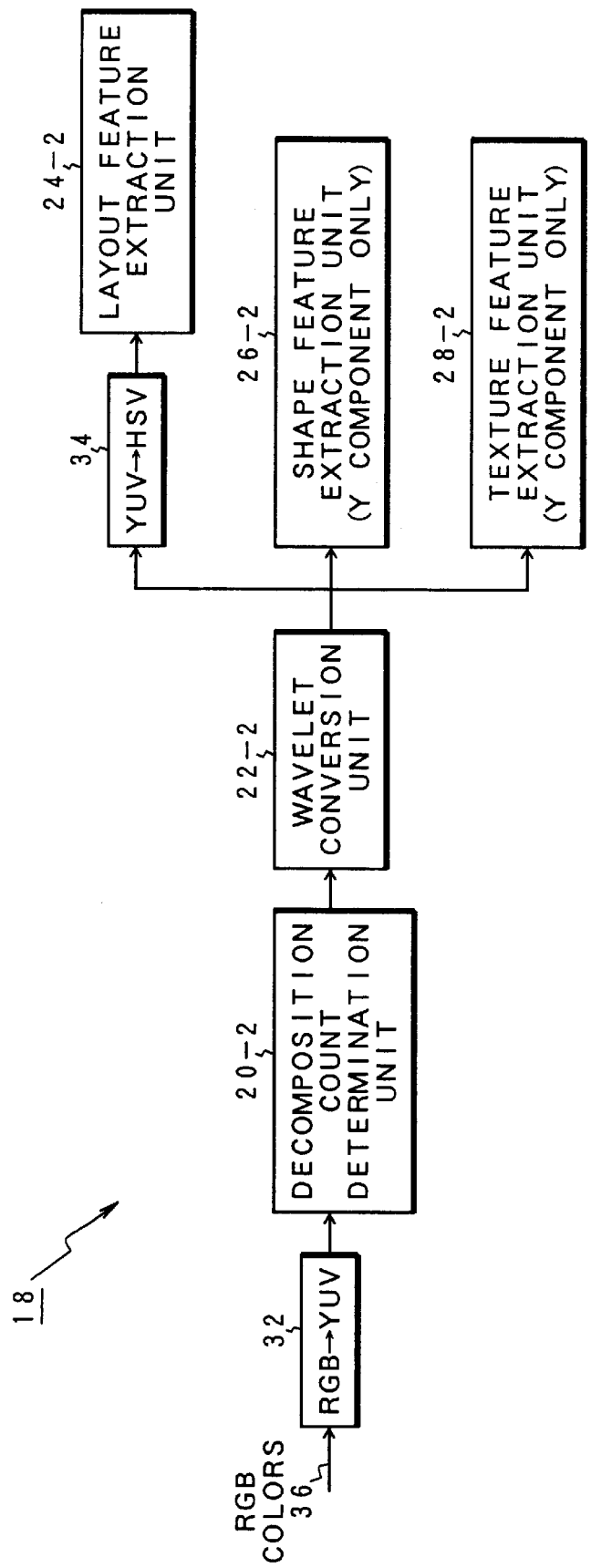
FIG. 5 is a function block diagram of a color image feature extraction unit shown in FIG. 1, which is another embodiment of the present invention.

FIG. 5 is a function block diagram of the color image feature extraction unit 18 provided in the feature extraction unit 10 of FIG. 1. The color image extraction unit 18 of FIG. 5 includes an RGB/YUV transformation unit 32, a decomposition number determination unit 20-2, a wavelet transformation unit 22-2, a YUV/HSV transformation unit 34, a layout feature extraction unit 24-2, a shape feature extraction unit 26-2 and a texture extraction unit 28-2. Image colors to be processed by the color image feature extraction unit 18 can be for example RGB color image data 36 within the RGB color space. The color image feature extraction unit 18 differs from the gray scale image feature extraction unit 16 which processes one-component image data of FIG. 3, in that the former processes RGB three-component image data.

Figure 6:
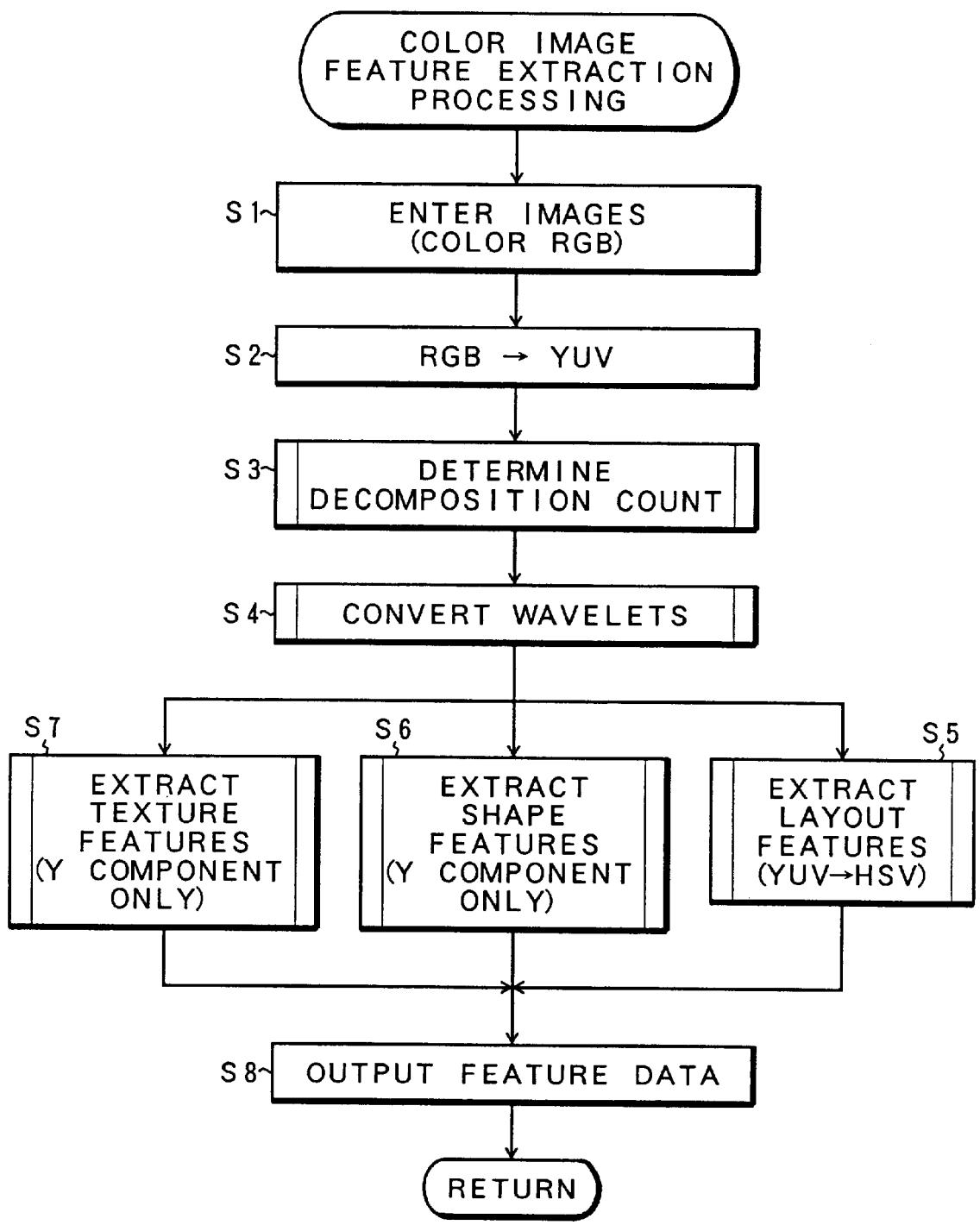
FIG. 6 is a flowchart of color image feature extraction processing effected by the color image feature extraction unit of FIG. 5.

FIG. 6 is a flowchart of the color image feature extraction processing corresponding to FIG. 5. When RGB color image data are entered in step S1, the color representation is transformed from the RGB color space to the YUV color space in step S2. The decomposition number K for wavelet transformation is then determined in step S3. This determination of the decomposition number is the same processing as in the case of the gray scale image of FIG. 3. Then in step S4 the wavelet transformation is carried out in accordance with the decomposition number K. In this wavelet transformation the YUV three components each undergo the wavelet transformation. The wavelet transformed data are then subjected to the feature extraction processings including the texture feature extraction, the shape feature extraction and the layout feature extraction in steps S5, S6 and S7, respectively. The resultant feature data are then provided as outputs in step S8. In case of the color images, the layout color distribution is important for the layout feature extraction of step S5, and the layout feature is figured out on the basis of the post-wavelet transformation lowest frequency band. In this case, for the extraction of the layout feature, the lowest frequency band YUV color space data are transformed into the HSV color space that is known as an optimum color space in conformity with the human senses. Although this embodiment employs the HSV color space as the color space for the layout feature extraction, the other color spaces such as Lab color space or Munsell color space may be employed for the transformation as long as they match the human senses. Herein, the following expressions (1), (2) and (3) can be used for the transformation from the RGB color space to the YUV color space of step S2 and for the transformation from the YUV color space to the HSV color space of step S5.

$$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix} + \begin{pmatrix} 0 \\ 0.5 \\ 0.5 \end{pmatrix} \quad (1)$$

$$\begin{pmatrix} R \\ G \\ B \end{pmatrix} = \begin{pmatrix} 1.000 & 0.000 & 1.140 \\ 1.000 & -0.395 & -0.581 \\ 1.000 & 2.032 & 0.000 \end{pmatrix} \left( \begin{pmatrix} Y \\ U \\ V \end{pmatrix} - \begin{pmatrix} 0 \\ 0.5 \\ 0.5 \end{pmatrix} \right) \quad (2)$$

$$\begin{aligned} V &= \max(R, G, B) \\ m &= \min(R, G, B) \\ S &= \begin{cases} (V-m)/V & (\text{if } V \neq 0) \\ 0 & (\text{if } V = 0) \end{cases} \\ H &= \begin{cases} (G-B)/m & (\text{if } V = R \neq 0) \\ 2 + (B-R)/m & (\text{if } V = G \neq 0) \\ 4 + (R-G)/m & (\text{if } V = G \neq 0) \\ -1 & (\text{if } V = 0) \end{cases} \end{aligned} \quad (3)$$

More specifically, the step S2 of FIG. 6 uses the expression (1) to transform the color representation from the RGB color space to the YUV color space. The step S5 uses the expression (2) for example to transform the YUV color space data within the post-wavelet transformation lowest frequency band to the RGB color space, and then uses the expression (3) for the transformation to the HSV color space. In the shape feature extraction of the step S6, the shape feature is figured out on the basis of the second lowest frequency band after wavelet transformation. Since the shape feature involves no color concept, in cases where the color space is the YUV space the shape feature is figured out by use of Y components on which the most amount of signals can concentrate. In the texture feature extraction of the step S7, the texture feature is figured out on the basis of the average and the deviation of frequency bands excepting the post-wavelet transformation lowest frequency band. In this case as well, the texture feature involves no color concept, and hence the texture feature is figured out by use of Y components on which the most amount of signals can concentrate in the YUV color space.

If the FIG. 5 function blocks of the color image feature extraction unit 18 is viewed in terms of the program structures, the blocks consist of a function for allowing free, bidirectional transformation among the RGB, YUV and HSV color spaces, in addition to the function for determining the resolution decomposition number from the image size information, the function for making resolution decomposition by means of the wavelet transformation and the function for retrieving features of the layout, shape and texture from the post-transformation data, in the same manner as the case of the gray scale image feature extraction unit 16 of FIG. 3.

Figure 7:
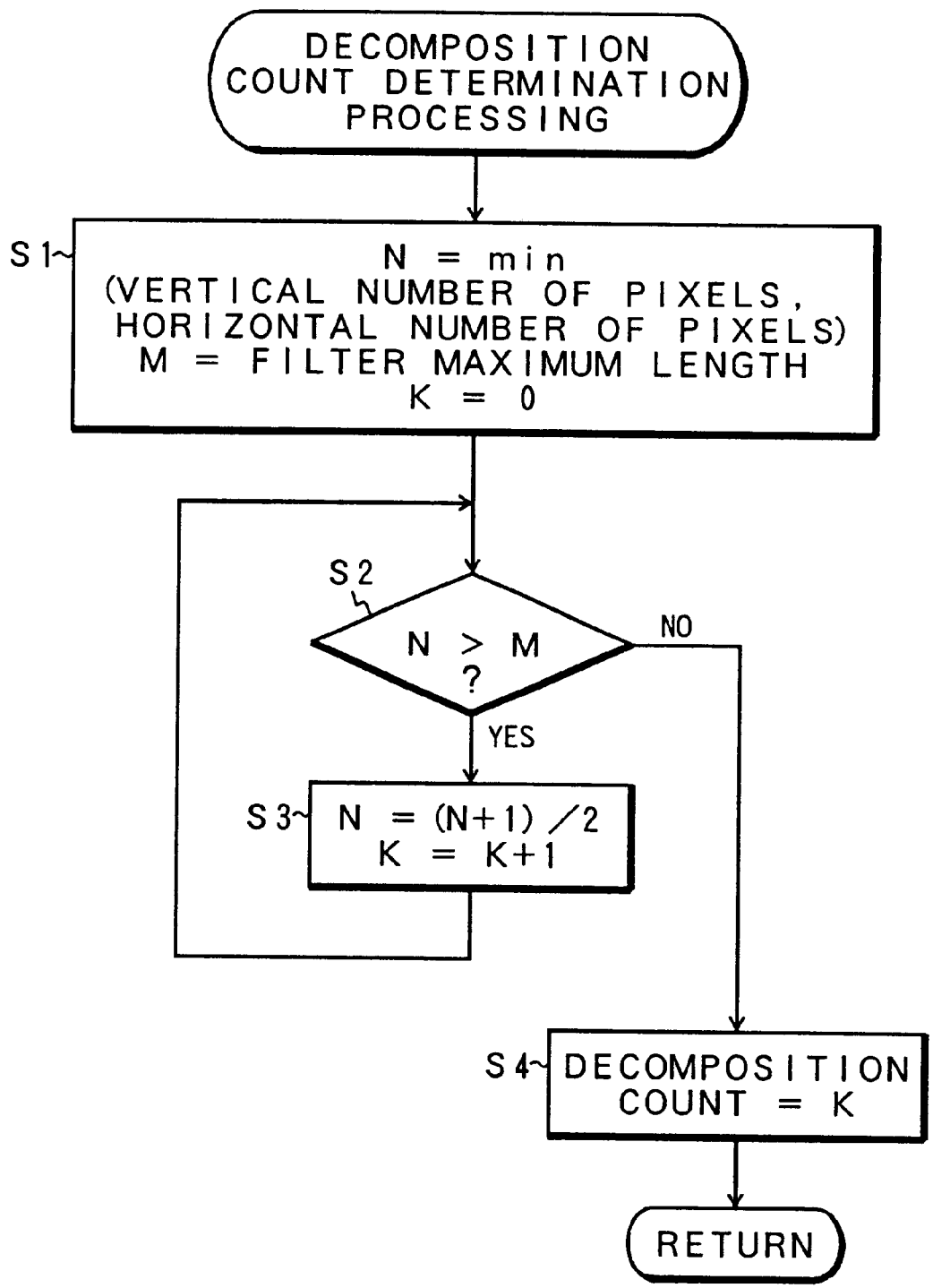
FIG. 7 is a flowchart of decomposition number determination processing effected by a decomposition number determination unit of FIG. 3 and FIG. 5.

FIG. 7 is a flowchart of an algorithm for determining the decomposition number K of the multiple resolution analysis by means of the wavelet transformation in the step S2 of FIG. 4 and the step S3 of FIG. 6. In this decomposition number determination processing, a smaller one between the vertical number of pixels and the horizontal number of pixels of the gray scale image or the color image entered is first selected as the minimum number of pixels N, with the wavelet transformation filter maximum length M and the decomposition number K=0. Then the procedure goes to step S2 in which the vertical or horizontal minimum number of pixels N is compared with the filter maximum length M. If the vertical or horizontal number of pixels N is larger than the filter maximum length M, then 1 is added to the smaller vertical or horizontal number of pixels in step S3 to halve the size while simultaneously increment the decomposition number by 1 to K=K+1. The processings of the steps S2 and S3 are iterated until the vertical or horizontal number of pixels becomes smaller than the filter maximum length M as a result of the size decomposition and reduction in the step S2, after which the procedure goes to step S4 to define the number of times at that time as the decomposition number K. This decomposition number determination processing algorithm allows the decomposition number K for the multiple resolution analysis by use of the wavelet transformation to dynamically be determined depending on the image size, to decompose the size of the lowest frequency band LL after wavelet transformation to a certain value or below.

Figure 8:
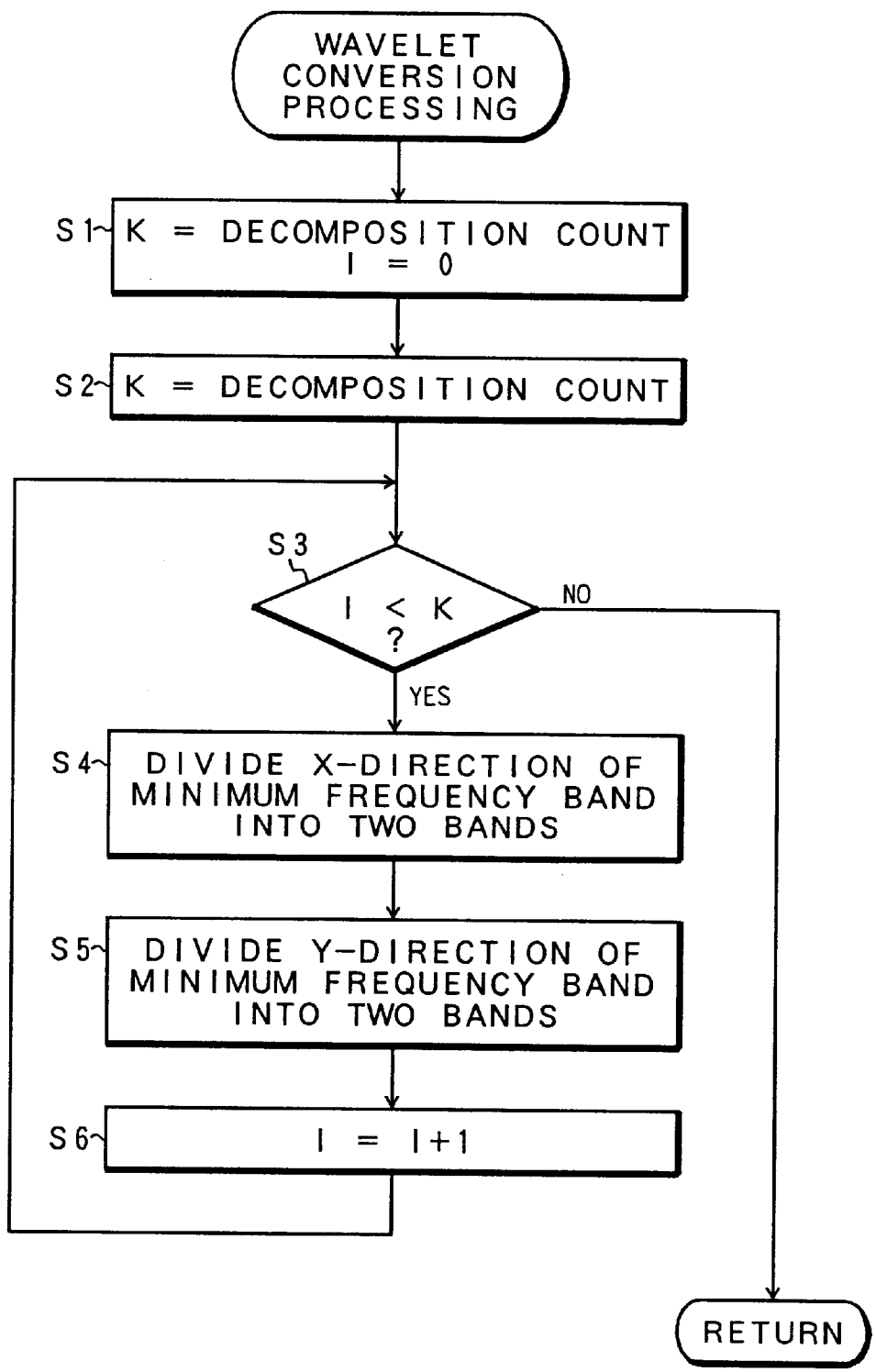
FIG. 8 is a flowchart of wavelet transformation processing effected by a wavelet transformation unit of FIGS. 3 and 5.

FIG. 8 is a flowchart of the wavelet transformation processing effected in the step S3 of FIG. 4 and the step S4 of FIG. 6. In this wavelet transformation processing, the decomposition number K is defined in step S1 with a counter I being set to I=0, after which the decomposition number determined by the algorithm of FIG. 7 is set as the decomposition number K in step S2. Then in step S3, comparison is made between the decomposition number K and the counter I. If the counter I is smaller than the decomposition number K, in step S4 the frequency band is split into two bands in X direction through the wavelet transformation using the wavelet filter, and then in step S5 the lowest frequency band is decomposed into two bands in Y direction through the wavelet transformation. Then in step S6 the counter I is incremented by one, after which the procedure returns to the step S3. Afterwards, iteration is made of the processings of the steps S4 and S5 for decomposing the lowest frequency band into two bands in X and Y directions, respectively, through the wavelet transformation.

Figures 9, 10:
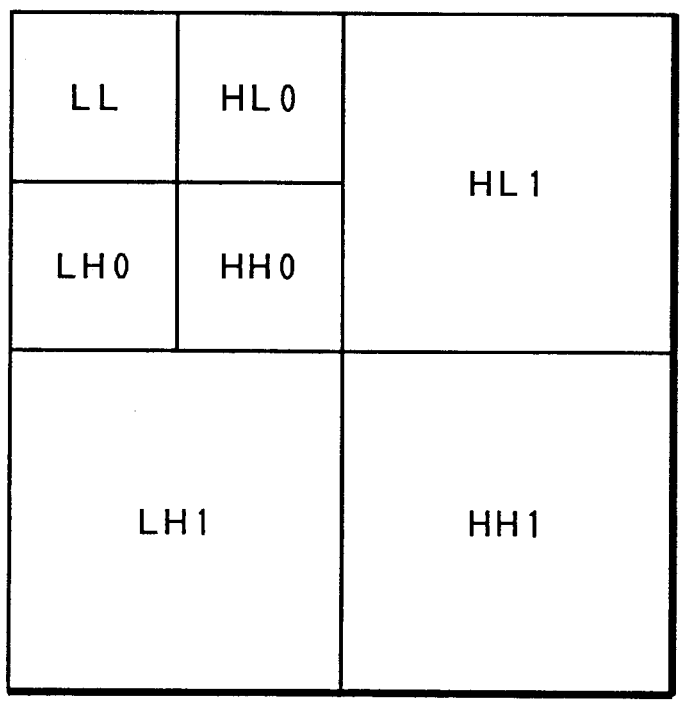
FIG. 9 is an explanatory diagram of a filter coefficient for use in the wavelet transformation processing of FIG. 8.
FIG. 10 is an explanatory diagram of wavelet transformation bands in the case where the decomposition number is two.

For the wavelet transformation processing of FIG. 8, this embodiment uses a spline wavelet filter for example whose filter coefficient can be for example a low-pass filter coefficient (the coefficient of a scale function (X)) and a high-pass filter coefficient (the coefficient of a wavelet function Ψ(X)) which are shown in FIG. 9.

FIG. 10 shows frequency band data acquired by the wavelet transformation processing of FIG. 8, depicting by way of example a two-layered data structure where n =0, 1 after wavelet transformation with the decomposition number K=2. For this data structure after wavelet transformation, following is the description of extraction of the layout feature, the shape feature and the texture feature in accordance with the present invention. First in the texture feature extraction, the lowest frequency band LL of the wavelet transformed data structure reflects a rough luminance distribution of the entire image, so that the texture feature is retrieved on the basis of the lowest frequency band LL.

Figure 11:
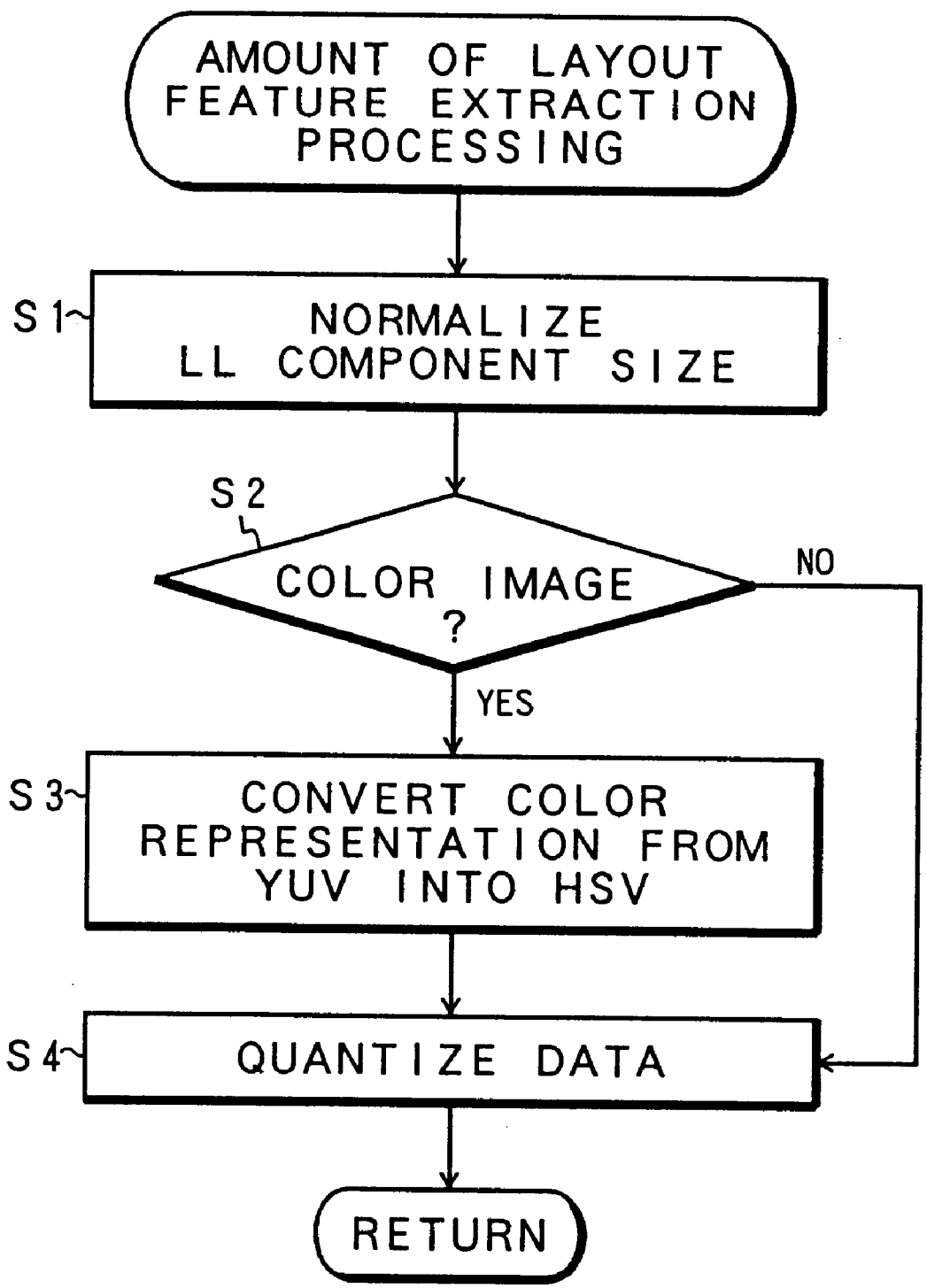
FIG. 11 is a flowchart of layout feature extraction processing effected by a layout feature extraction unit of FIGS. 3 and 5.

FIG. 11 is a flowchart of the layout feature extraction processing whose target is the wavelet transformed data structure of FIG. 10. First in step S1 a size normalization is performed of the lowest-frequency band LL component. The size normalization of the lowest frequency band LL components is for matching of the data size in the similarity calculation based on the features. The size normalization method includes interpolating a shorter one of the vertical and horizontal sides of the lowest frequency band LL components so as to obtain predetermined lengths, e.g., 16 data points. After the completion of the size normalization in the step S1, a check is made in step S2 to see if it is a color image or not. If affirmative, then the procedure goes to step S3 for transformation of the color representation of the lowest frequency band LL components from the YUV color space to the HSV color space. The above expressions (2) and (3) are used for this transformation. In case of the gray scale image, the step S3 is skipped. Then in step S4, the amount of data is minimized and data quantization is carried out for the purpose of speedup of the reference upon the similarity judgment. In case of the gray scale image, this quantization is effected by quantizing values of the lowest frequency band components LL in such a manner that one data point has one byte size. In case of the color image composed of HSV three components, the quantization step is increased for each component of HSV in order to similarly speed up the reference upon the similarity judgment, and quantization is performed so that one data point can provide one byte as a result of totaling up the HSV three components.

Description will then be made of the shape feature extraction based on the data structure after the wavelet transformation of FIG. 10. In the wavelet transformed data structure, a rough contour is reflected on components of the frequency bands HL0, LH0 and HH0 of the first layer (n=0) having the second lowest frequency. Thus, to retrieve the shape feature, use is made of the components of the frequency bands HL0, LH0 and HH0 of the first layer having the second lowest frequency.

Figure 12:
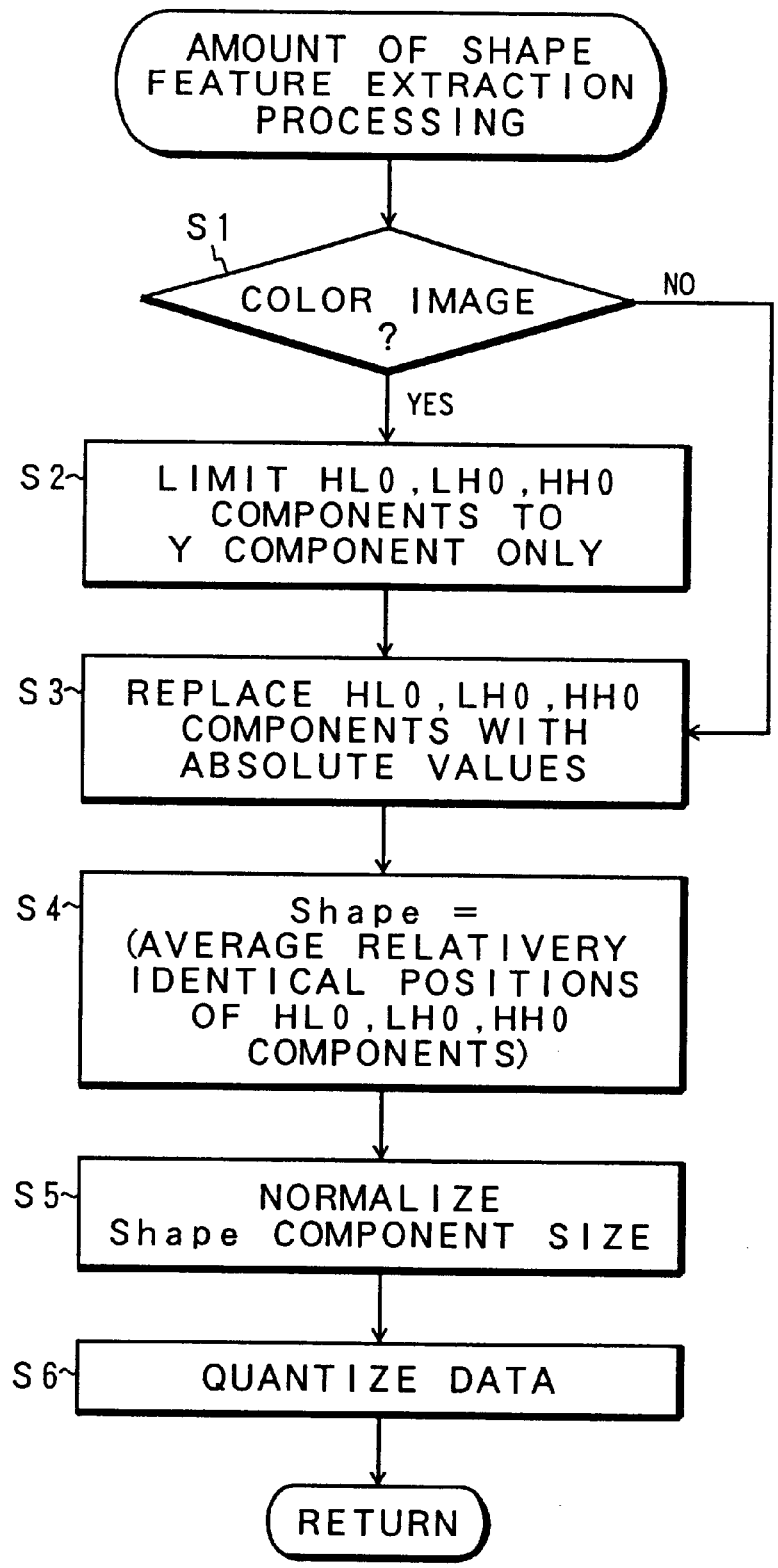
FIG. 12 is a flowchart of shape feature extraction processing effected by a shape feature extraction processing of FIGS. 3 and 5.

FIG. 12 is a flowchart of the shape feature extraction processing in accordance with the present invention, of which target is the wavelet transformed data structure of FIG. 10. First in step S1, a check is made to see if it is a color image or not. If affirmative, then the procedure goes to step S2 in which the components of the frequency bands HL0, LH0 and HH0 are limited to Y components only. Then in step S3, the Y components of the frequency bands HL0, LH0 and HH0 are replaced with absolute values. The shape features being whether any contours exist or not therein, it suffices to obtain the absolute values of the frequency bands HL0, LH0 and HH0. In case of the gray scale image, the step S2 is skipped. Then in step S4, a shape feature "Shape" is defined and values of Y components at relatively same positions of the frequency bands HL0, LH0 and HH0 are averaged and saved as a piece of data. Although for this reason the shape features are retrieved from the three frequency bands, the processing of the step S4 allows the number of pieces of data to become equal to the amount of layout feature. Then in step S5, the size normalization is carried out of the components of the shape feature "Shape" collected into one band, in the same manner as the step S1 of FIG. 12. Then in step S6, the quantization is effected in order to speed up the reference upon the similarity judgment, allowing one data point to be one byte.

Description will then be made of the texture feature that is obtained from the wavelet transformed data structure of FIG. 10. In this wavelet transformed data structure, contour vertical components for each frequency band are reflected on the frequency bands HL0 and HL1, contour horizontal components for each frequency band are reflected on the frequency bands LH0 and LH1, and contour diagonal components for each frequency band are reflected on the frequency bands HH0 and HH1. The texture features are then retrieved from frequency band sets (HL0, HL1), (LH0, LH1) and (HH0, HH1). For this texture feature, the average value A and the deviation value σ or are figured out for each frequency band excepting the lowest frequency band LL, to form a vector in the frequency band directions, i.e., HL direction, LH direction and HH direction. Let $A^n_{HL}$ and $\sigma^n_{HL}$ be the average and the deviation in the HL direction of the n-th layer for example, then the vectors in the respective directions can be defined as:

$$\overline{V}_A = (A^0_{HL}, A^1_{HL}, A^2_{HL}, \ldots) \quad (4)$$

$$\overline{H}_A = (A^0_{LH}, A^1_{LH}, A^2_{LH}, \ldots) \quad (5)$$

$$\overline{D}_A = (A^0_{HH}, A^1_{HH}, A^2_{HH}, \ldots) \quad (6)$$

$$\overline{V}_\sigma = (\sigma^0_{HL}, \sigma^1_{HL}, \sigma^2_{HL}, \ldots) \quad (7)$$

$$\overline{H}_\sigma = (\sigma^0_{LH}, \sigma^1_{LH}, \sigma^2_{LH}, \ldots) \quad (8)$$

$$\overline{D}_\sigma = (\sigma^0_{HH}, \sigma^1_{HH}, \sigma^2_{HH}, \ldots) \quad (9)$$

Figure 13:
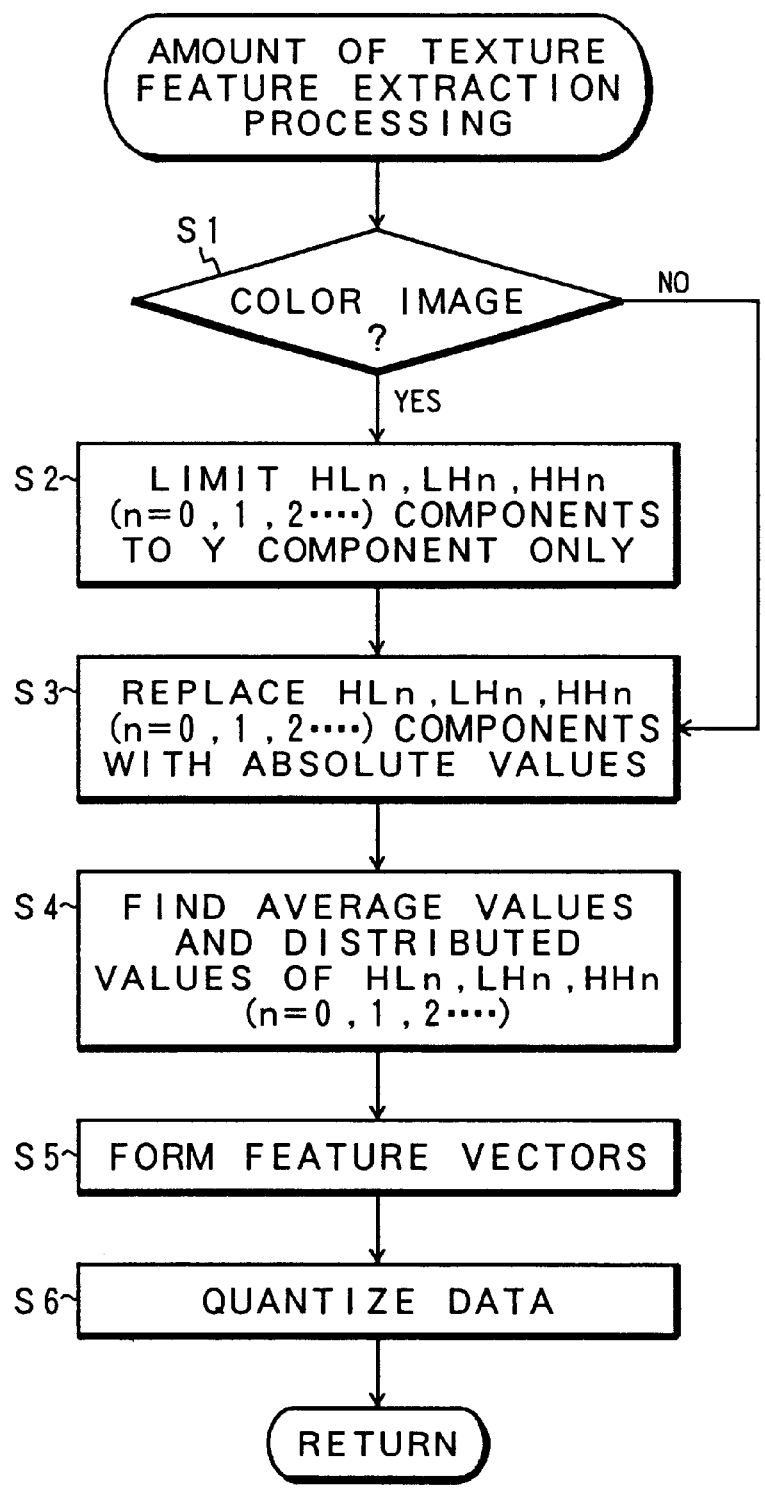
FIG. 13 is a flowchart of texture feature extraction processing effected by a texture feature extraction unit of FIGS. 3 and 5.

FIG. 13 is a flowchart of the texture feature extraction processing in accordance with the present invention. A check is first made in step S1 to see if it is a color image or not. If affirmative, then the procedure goes to step S2 in which components of the frequency bands HLn, LHn (where n=0, 1, 2, ... ) are limited to Y components only. In case of the gray scale image, the step S2 is skipped. Then the procedure goes to step S3 to replace the components of the frequency bands HLn, LHn and HHn with absolute values. Then in step S4, the average values and the deviation values of the frequency bands HLn, LHn and HHn are figured out. Then in step S5, the feature vectors representative of the texture features are formed using the expressions (4) to (9). Finally in step S6, quantization is effected on the feature vector components in order to speed up the reference upon the similarity judgment, to thereby reduce the amount of data.

Figure 14:
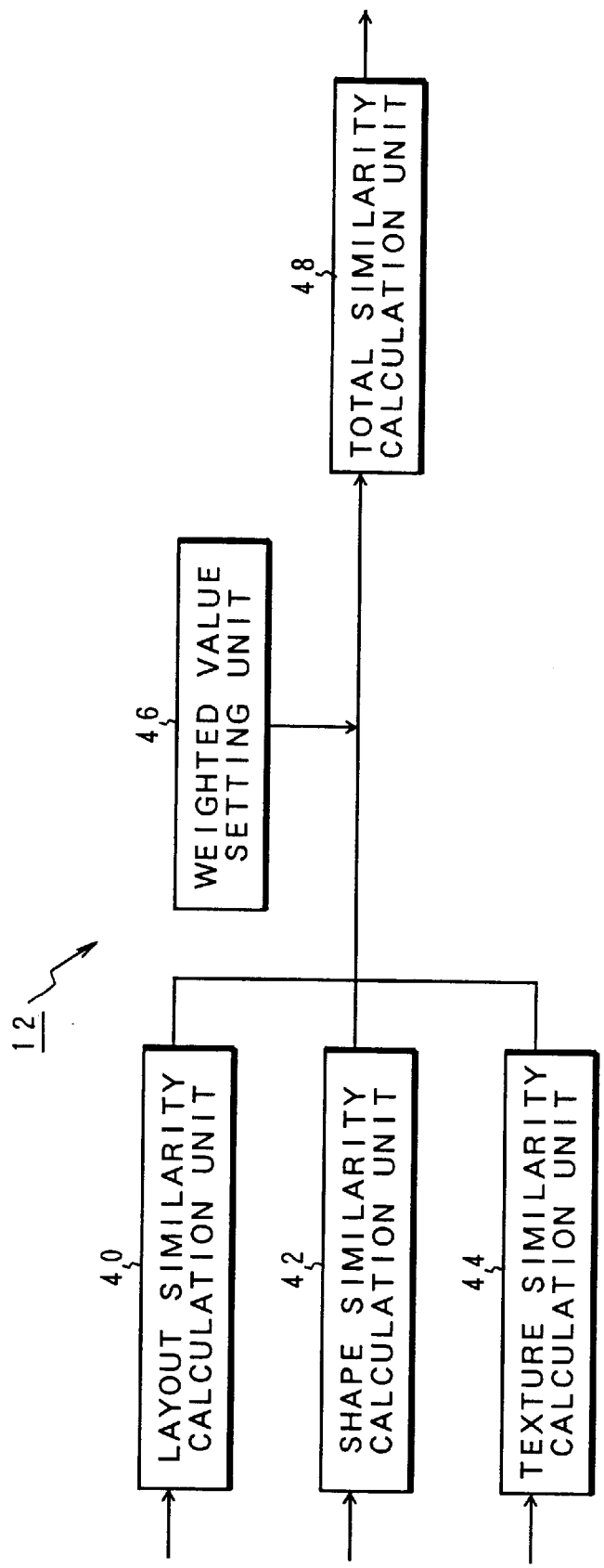
FIG. 14 is a function block diagram of a similarity calculation unit of FIG. 1.

FIG. 14 is a function block diagram of the similarity calculation unit 12 provided in the similar image retrieval system of FIG. 1. The similarity calculation unit 12 comprises a layout similarity calculation unit 40, a shape similarity calculation unit 42, a texture similarity calculation unit 44, a weighted value setting unit 46 and a total similarity calculation unit 48.

In terms of the program structure, the function blocks of the similarity calculation unit 12 include a function for figuring out the similarity for each of the layout, shape and texture features that have been obtained for the key image 50 and the candidate image 60 as in the image memory 14 of FIG. 1, and a function for figuring out the total similarity with a predetermined weight for each of the layout, shape and texture features.

Figure 15:
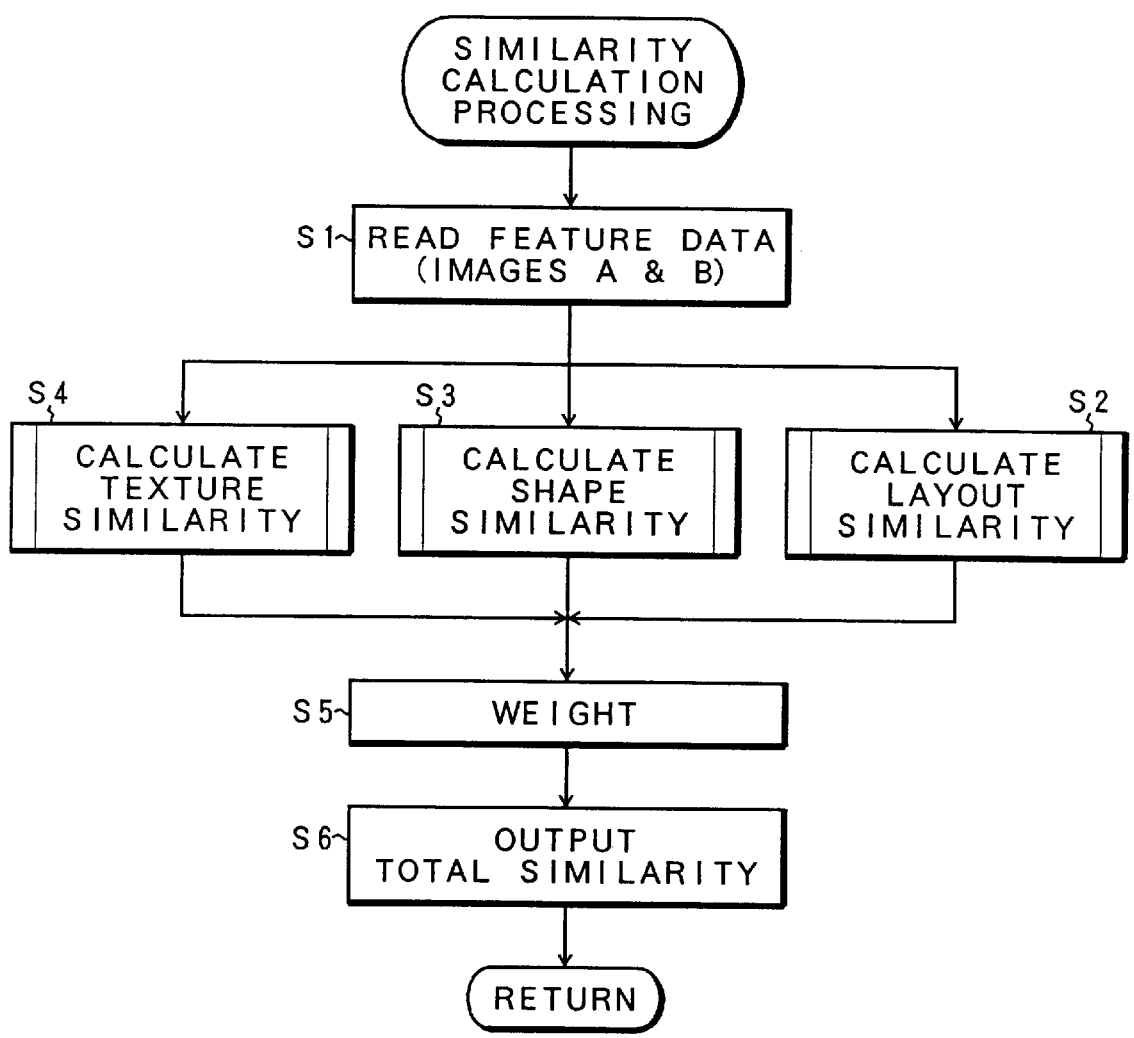
FIG. 15 is a flowchart of similarity calculation processing effected by units of FIG. 14.

FIG. 15 is a flowchart of the similarity calculation processing of FIG. 14. For this similarity calculation processing, first read in step S1 are layout, shape and texture feature data of the key image and the candidate image that have been transformed by the feature extraction unit 10 of FIG. 2. Then in steps S2, S3 and S4, the distance x between two images is figured out for the layout, shape and texture features, respectively, so that the similarities are given as (1−x). Then in step S5, a predetermined weight or a user specified weight is imparted to the thus calculated layout, shape and texture similarities. Then in step S6, the thus weighted three similarities are added together to obtain a total similarity for the output. Following is the description of details of calculation of the layout, shape and texture similarities. Upon the calculation of the layout similarity, the distance between two images is calculated for each of data points of the layout features that have been figured out for the key image and the candidate image. Given for this layout features are component values that have been obtained by transforming the lowest frequency band LL components in the wavelet transformed data structure of FIG. 10 into HSV components. The HSV component values are used to obtain the distance between two images. Let (Hi, Si, Vi) and (Hj, Sj, Vj) be components of two data points for the calculation of the distance between two images in the HSV color space, then the distance in the HSV color space can be given as $$[\tfrac{1}{3}\{(S_i \cos H_i - S_j \cos H_j)^2 + (S_i \sin H_i - S_j \sin H_j)^2 + (V_i - V_j)^2\}]^{1/2} \quad (10)$$

Figure 16:
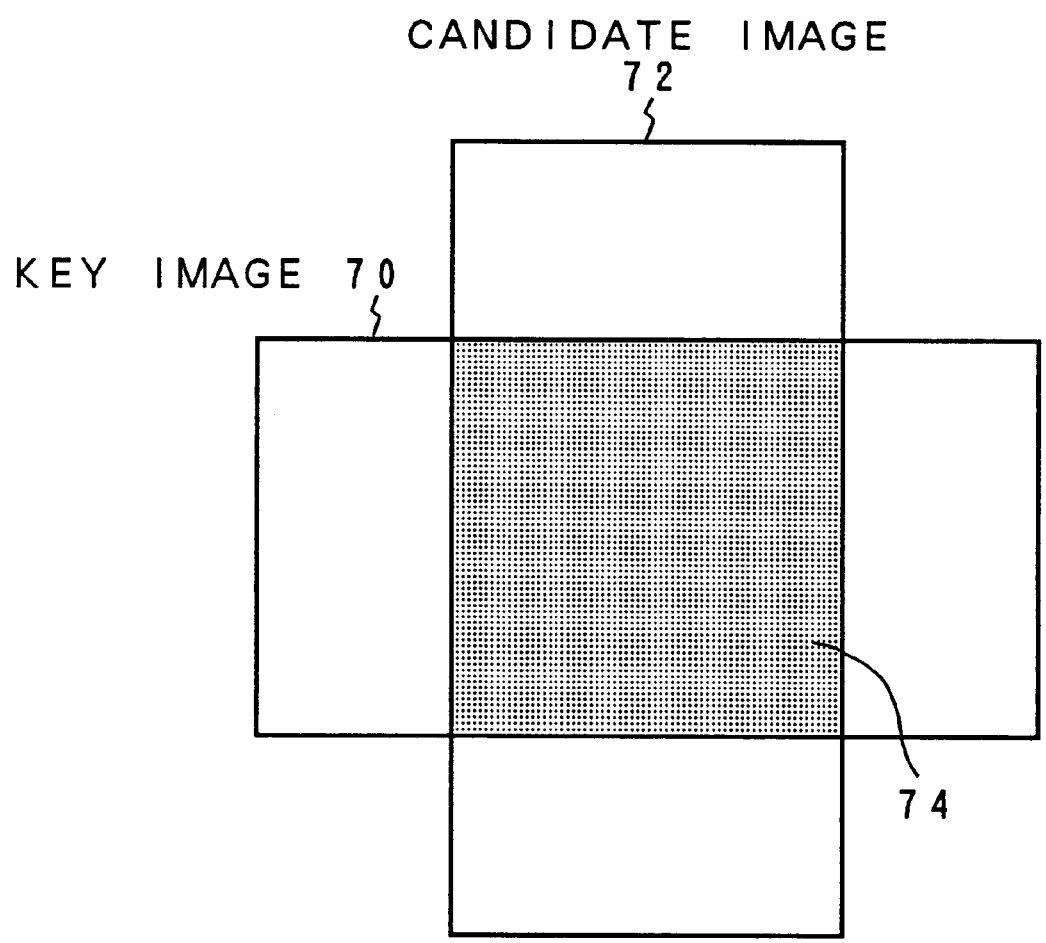
FIG. 16 is an explanatory diagram of a band alignment for calculating the similarity of wavelet transformation bands different in size.

In cases where the lowest frequency band LL images that have been obtained as in FIG. 10 for example after the wavelet transformation have different aspect ratios, the central regions of the key image texture feature band 70 and of the candidate image texture feature band 72 are caused to overlap with each other as depicted in FIG. 16, and the distance of the texture feature is figured out in an overlapping region 74 only.

Figure 17:
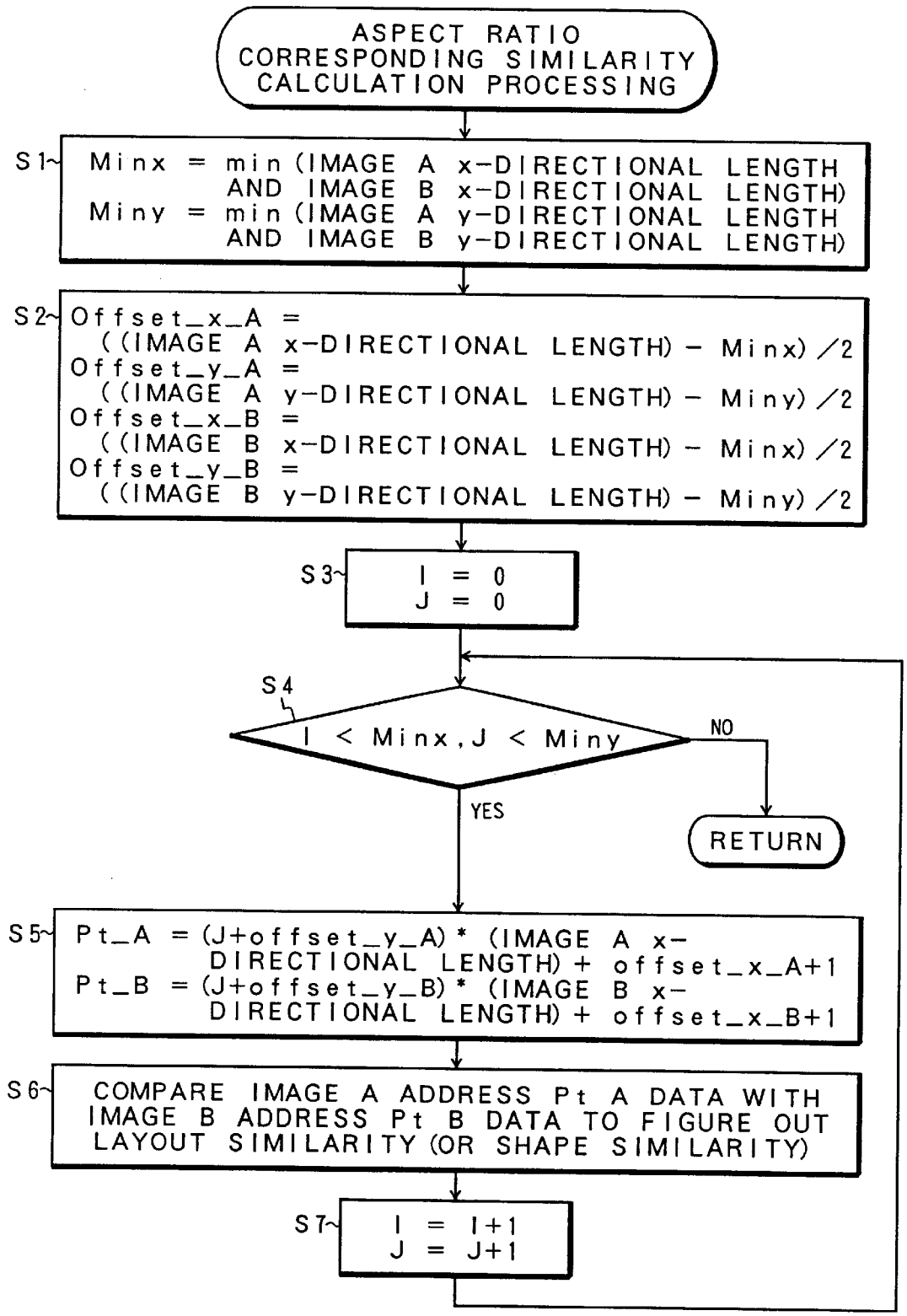
FIG. 17 is a flowchart of similarity calculation processing that corresponds to the aspect ratio of FIG. 16.

FIG. 17 is a flowchart for the similarity calculation in case of different aspect ratios as in FIG. 16, showing an algorithm for calculating the distance by causing the two image regions to overlap with each other at their central regions. Herein, images A and B correspond to the two image feature regions 70 and 72 of FIG. 16. First in step S1, Minx is given to a shorter one between the length of the image A in x direction and the length of the image B in x direction. In the same manner, Miny is given to a shorter one between the length of the image A in y direction and the length of the image B in y direction. Then in step S2, offsets of the images A and B in x and y directions are figured out in order to select data points for the comparison of the two images being centered as depicted in FIG. 17. Then in step S3, both the counter I of the image A and the counter J of the image B are reset to 0, and until the counters I and J exceed the shorter lengths Minx and Miny of the images A and B in the x and y directions in step S4, the processings of steps S5, S6 and S7 are iterated. In the step S5, a data point Pt__A of the image A to be compared and a data point Pt__B of the image B to be compared are figured out from their respective current locations (I, J) and from the offsets obtained in the step S2. Then in step S6, data point address Pt__A data of the image A are compared with the data point address Pt__B data of the image B, to figure out the layout similarities. Then in step S7, the counters I and J are incremented by one, after which the similarity calculation processings of the steps S5 and S6 are iterated until the overlapping region is exceeded in the step S4. This aspect ratio corresponding similarity calculation processing of FIG. 17 is applicable intactly to the case where the images A and B have the same aspect ratio. In case of the same aspect ratio, their respective offsets become merely zero in step S2. Although FIG. 17 shows by way of example the case of the layout feature similarity calculation, the same applies to the case of the shape features that have been obtained by adding together the second lowest frequency bands HL0, LH0 and HH0 of FIG. 10. In cases where either of the key image and the candidate image is a gray scale image and the other is a color image in the layout feature similarity calculation processing, the color image V component will correspond to the gray scale luminance, and hence only the V component among the HSV components of the color image layout feature is used to find the distance relative to the gray scale image layout feature, to thereby figure out the similarity. Then in case of the similarity calculation based on the shape features, the same procedure as the similarity calculation based on the layout features is employed to figure out the similarity due to the same data point number and arrangement as the layout feature components. The difference therebetween lies only in that the shape feature consists of only the color component Y without any distinction in the color components, so that the distance $(Yi - Yj)^2$ has only to be found between the luminance component Yi of the key image shape feature and the luminance component Yj of the candidate image shape feature.

In case of the calculation of the texture feature similarity, the vectors are compared with each other that have been obtained in the form of the texture features for the key image and the candidate image as shown in the expressions (4) to (9). For the calculation of the distance based on the comparison between the vectors, Manhattan distance of each vector is figured out. That is, the distance L between two vectors is given as:

$$L = \left\| \vec{V}_A^\alpha - \vec{V}_A^\beta \right\| = \left| A_{HL}^{0\alpha} - A_{HL}^{0\beta} \right| + \left| A_{HL}^{1\alpha} - A_{HL}^{1\beta} \right| + \cdots \quad (11)$$

It will naturally be appreciated that any appropriate distance operation, other than the Manhattan distance, for the comparison between the vectors would be applicable.

Figure 18A:
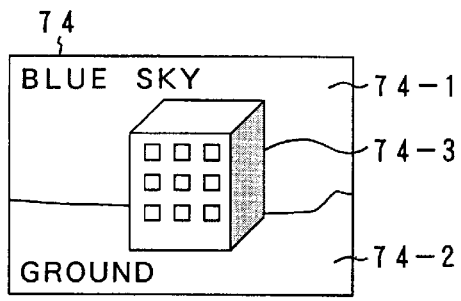
FIGS. 18A to 18D are explanatory diagrams of the results of similar image retrieval using only the layout feature.
Figure 18B:
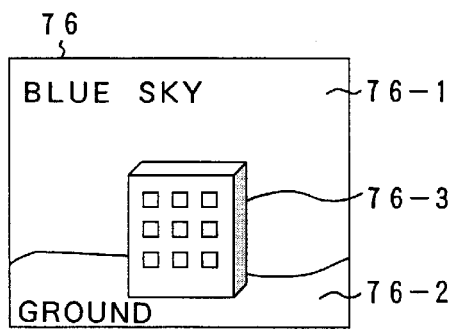
Figure 18C:
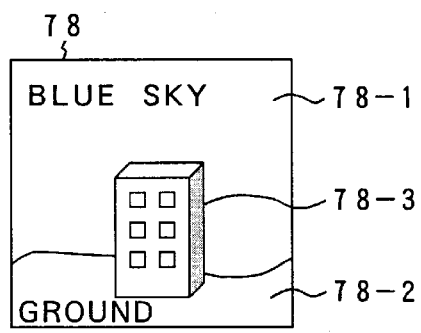
Figure 18D:
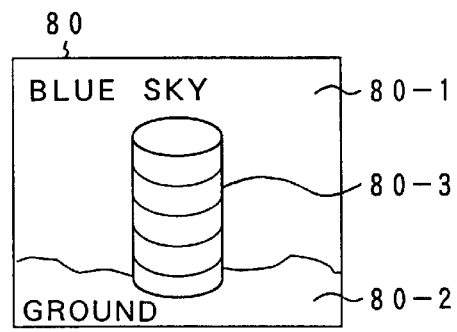

FIGS. 18A to 18D show by way of example the similar image retrieval results obtained when such a weighting has been effected as to render only the layout similarity effective in FIG. 14. FIG. 18A shows a key image 74, with the key image layout halved by a blue sky 74-1 and a ground 74-2, with a building 74-3 in the middle. In the texture features that have been obtained in the form of HSV components of the lowest frequency band LL based on the wavelet transformation, similarities with respect to such a key image 74 are calculated of a first candidate 76, a second candidate 78 and a third candidate 80 of FIGS. 18B, 18C and 18D, respectively. As a result of this, 90% of similarity is given to the first candidate 76 having a different angle from that of the key image 74, 80% of similarity is given to the second candidate 78 having a different building 78-3 from that of the key image 74, and 60% of similarity is given to the third candidate 80 having a different building 80-3 from that of the key image 74.

Figure 19A:
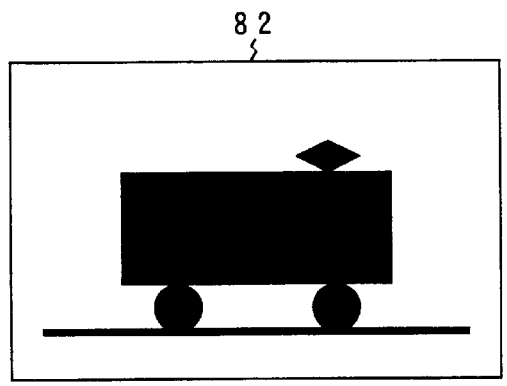
FIGS. 19A to 19C are explanatory diagrams of the results of similar image retrieval using only the shape feature.
Figure 19B:
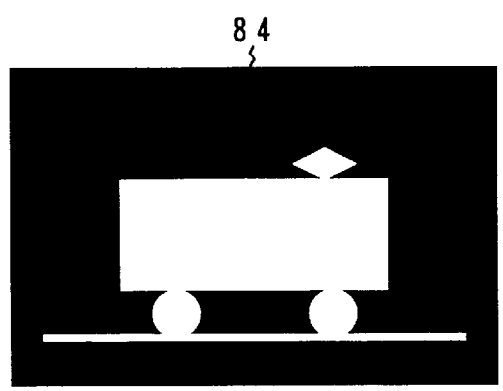
Figure 19C:
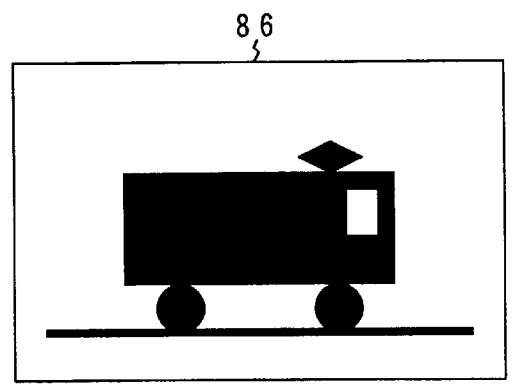

FIGS. 19A to 19C show by way of example the similar image retrieval results obtained when such a weighting has been effected as to render only the shape similarity effective in FIG. 14. In the shape features based on the second lowest frequency bands HL0, LH0 and HH0 that have been obtained through their respective wavelet transformations, the similarities with respect to a key image 82 of an electric locomotive of FIG. 19A are figured out of a first candidate 84 of FIG. 19B and a second candidate 86 of FIG. 19C. As a result, 100% of similarity is given to the first candidate 84 that is a white-black reversal of the key image 82, and 90% of similarity is given to the second candidate 86 whose vehicle is provided with a window, different from that of the key image 82.

Figure 20A:
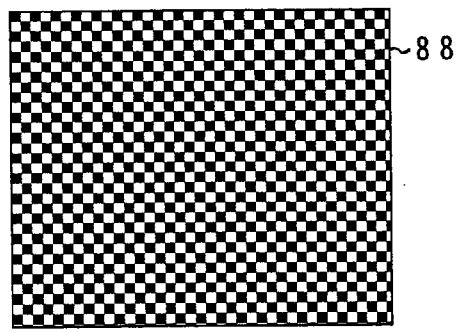
FIG. 20A to 20D are explanatory diagrams of the results of similar image retrieval using only the texture feature.
Figure 20B:
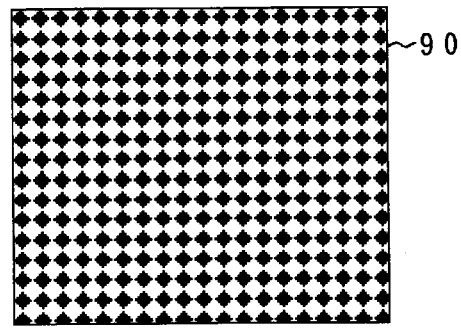
Figure 20C:
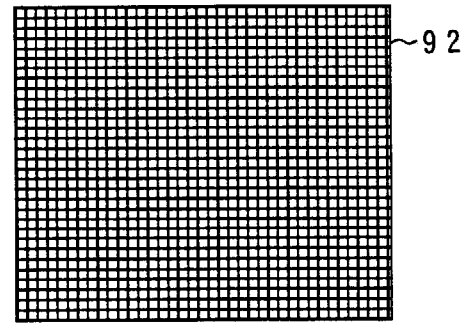
Figure 20D:
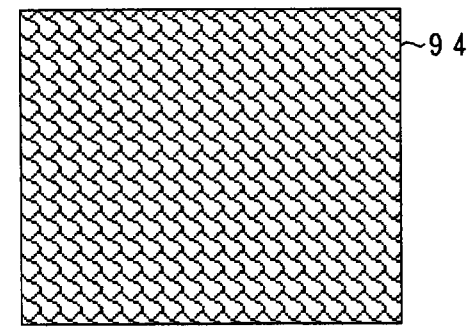

FIGS. 20A to 20D show by way of example the similar image retrieval results obtained when such a weighting has been effected as to render only the texture similarities effective in FIG. 18. FIG. 20A shows a key image 88, relative to which similarities are figured out of a first candidate 90 of FIG. 20B, a second candidate 92 of FIG. 20C, . . . , a n-th candidate 94 of FIG. 20D. With respect to the texture of the key image 88, the first candidate 90, the second candidate 92 and the n-th candidate 94 have similarities of 90%, 80% and 5%, respectively, relative to the key image 8.

In this manner, the present invention finds features inherent to the layout, shape and texture on the basis of the wavelet transformed frequency bands, figures out the similarities between the key image and the candidate image for those features, and, if necessary, imparts weights to the similarities of the layout, shape or the texture to thereby find a total similarity to achieve a high-speed, extremely flexible similar image retrieval.

Furthermore, the present invention provides a computer readable program record medium in which is stored an image feature extraction program composed of functions for implementing the function blocks of the feature extraction unit 10 in accordance with the present invention of FIG. 1, more specifically, the gray scale image feature extraction unit 16 of FIG. 3 and the color image feature extraction unit 18 of FIG. 5. The computer readable program record medium having stored therein the image feature extraction program in accordance with the present invention can be appropriate portable record medium such as a CD, a CD-ROM, a DVD, a DVD-ROM, an MD or an FD that stores therein the image feature extraction program of the present invention. It further provides a computer readable record medium that stores therein a similarity calculation program corresponding to the similarity calculation unit 12 of FIG. 1, more specifically a similarity calculation program for implementing the function blocks of FIG. 15 in addition to the image feature extraction program corresponding to the feature extraction unit 10 of FIG. 1. Naturally, the record medium may store a similarity calculation program recorded independently. The image feature extraction program storing record medium of the present invention can naturally include any appropriate record medium that can be dealt as a single record medium removable relative to the information processing apparatuses such as personal computers.

According to the present invention as set forth hereinabove, the three different features of the layout, shape and texture can be acquired rapidly from post-transformation frequency bands through the utilization of the multiple resolution analysis of the wavelet transformation. Furthermore, the layout, shape and texture acquired from the wavelet transformed data represent features matching the human subjectivity. Thus, by imparting appropriate weights to the similarity calculation results based on those features, a high flexibility can be obtained upon the retrieval of the similar image. The wavelet transformation based extraction of the features of the layout, shape and texture can achieve a scale invariance with which any images having the same contents can be recognized as the same one irrespective of the image size, thereby ensuring an appropriate extraction of the content features without depending on the image size. In spite of the interminglement of the color image and the gray scale image, the shape and texture components are the same component, so that the layout feature can be composed of only the luminance component in case of the color image so as to allow a comparison with the layout feature of the gray scale image. As a result of this, an appropriate implementation can be achieved of similar image retrieval from the layout, shape and texture features that have been extracted in accordance with the present invention. Furthermore, in case of retrieving similar images through the similarity calculations based on the features matching the human subjectivity such as the layout, shape and texture that have been obtained by the utilization of the wavelet transformation of the present invention, it is possible to retrieve in an appropriate manner any images, e.g., of similar but white-black reversal posters or of vehicles of the same type but different in color, by rendering only the shape weight effective. Furthermore, in case of rendering only the weight of the similarity calculated from the texture effective, appropriate image retrieval is ensured of the images analogous in roughness of the fabric texture or of the images of minerals or fossils having similar surfaces, whereby it is possible to implement a flexible retrieval of similar images by appropriately selecting the sort of the features.

It is to be appreciated that the present invention is not intended to be limited to the above embodiments and that it includes any appropriate variants without impairing the objects and advantages thereof. Furthermore, the present invention is not restricted by the numerical values indicated in the above embodiments.

What is claimed is:

1. An image analyzing apparatus comprising:

a wavelet transformation unit for receiving images to effect a wavelet transformation thereon, wherein said wavelet transformation unit upon reception of a color image in RGB color space transforms said color image received into a color image in YUV space to thereafter effect a wavelet transformation thereon;

a layout feature extraction unit determining a layout feature from a coefficient of the lowest frequency band after wavelet transformation, wherein said layout feature extraction unit transforms a coefficient of the lowest frequency band after wavelet transformation into a color representation in another color space matching human senses to thereby determine said layout feature;

a shape feature extraction unit Determining a shape feature from a coefficient of the second lowest frequency band after wavelet transformation, wherein said shape feature extraction unit uses only luminance values Y of YUV components constituting said coefficient of said second lowest frequency band after wavelet transformation to thereby determine said shape feature; and a texture feature extraction unit determining a texture feature from the average and deviation of frequency bands excepting the lowest frequency band after wavelet transformation, wherein said texture feature extraction unit determines said texture feature from the average and deviation of only luminance values Y of YUV components constituting coefficients of frequency bands after wavelet transformation.

2. An apparatus according to claim 1, wherein said layout feature extraction unit transforms said coefficient of said lowest frequency band after wavelet transformation into a color representation in HSV color space, Lab color space or Munsell color space to thereby determine said layout feature.

3. An apparatus according to claim 1, wherein said layout feature extraction unit normalizes said lowest frequency band after wavelet transformation into a predetermined size.

4. An apparatus according to claim 3, wherein said layout feature extraction unit interpolates shorter sides of said lowest frequency band after wavelet transformation to thereby achieve a size normalization.

5. An apparatus according to claim 1, wherein with respect to three bands in each of which is arranged said coefficient of said second lowest frequency band after wavelet transformation, said shape feature extraction unit finds an absolute value of each coefficient and averages coefficients at relatively same locations within said bands into one band coefficient.

6. An apparatus according to claim 1, wherein said texture feature extraction unit generates as texture features a vector whose vector components are an average and a deviation of coefficients of frequency bands of contour vertical components excepting said lowest frequency band after wavelet transformation, a vector whose vector components are an average and a deviation of coefficients of frequency bands of contour horizontal components, and a vector whose vector components are an average and a deviation of coefficients of frequency bands of contour diagonal components.

7. An apparatus according to claim 1, further comprising:

a similarity calculation unit to determine similarities between two images with respect to said layout feature, said shape feature and said texture feature that have been extracted by said feature extraction unit, said similarity calculation unit imparting weights to said similarities to determine a total similarity between the two images.

8. An image analyzing method comprising:

entering an image for a wavelet transformation;

determining a layout feature from a coefficient of the lowest frequency band after wavelet transformation;

determining a shape feature from a coefficient of the second lowest frequency band after wavelet transformation; and determining a texture feature from an average and a deviation of frequency bands excepting said lowest frequency band after wavelet transformation.

9. A computer readable recording medium comprising an image feature extraction program controlling a computer to:

enter an image for a wavelet transformation;

determine a layout feature from a coefficient of the lowest frequency band after wavelet transformation;

determine a shape feature from a coefficient of the second lowest frequency band after wavelet transformation; and determine a texture feature from an average and a deviation of frequency bands excepting said lowest frequency band after wavelet transformation.

10. An apparatus to analyze received wavelet transformations of images, comprising:

a layout feature extraction unit determining a layout feature from a coefficient of a lowest frequency band of the wavelet transformations;

a shape feature extraction unit determining a shape feature from a coefficient of a second lowest frequency band of the wavelet transformations; and a texture feature extraction unit determining a texture feature from the average and deviation of frequency bands excepting the lowest frequency band of the wavelet transformations.

* * * * *

UNITED STATES PATENT AND TRADEMARK OFFICE
CERTIFICATE OF CORRECTION

PATENT NO. : 6,728,406 B1
DATED : April 27, 2004
INVENTOR(S) : Kohei Murao

It is certified that error appears in the above-identified patent and that said Letters Patent is hereby corrected as shown below:

Column 14,
Line 52, change "Determining" to -- determining --.

Signed and Sealed this

Twentieth Day of July, 2004

JON W. DUDAS
*Acting Director of the United States Patent and Trademark Office*